United States Patent
Hoffman

(10) Patent No.: US 9,217,494 B2
(45) Date of Patent: Dec. 22, 2015

(54) MULTI-SPEED TRANSMISSION

(71) Applicant: FORD GLOBAL TECHNOLOGIES, LLC, Dearborn, MI (US)

(72) Inventor: Donald Edward Hoffman, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 242 days.

(21) Appl. No.: 13/953,055

(22) Filed: Jul. 29, 2013

(65) Prior Publication Data

US 2015/0031496 A1  Jan. 29, 2015

(51) Int. Cl.
*F16H 3/62* (2006.01)
*F16H 3/66* (2006.01)
*F16H 3/44* (2006.01)

(52) U.S. Cl.
CPC .. *F16H 3/62* (2013.01); *F16H 3/66* (2013.01); *F16H 3/663* (2013.01); *F16H 2003/447* (2013.01); *F16H 2200/0065* (2013.01); *F16H 2200/0073* (2013.01); *F16H 2200/0078* (2013.01); *F16H 2200/201* (2013.01); *F16H 2200/2012* (2013.01); *F16H 2200/2023* (2013.01); *F16H 2200/2048* (2013.01)

(58) Field of Classification Search
CPC ..... F16H 3/62; F16H 3/66; F16H 2200/0073; F16H 2200/2048; F16H 2200/201
See application file for complete search history.

(56) References Cited

U.S. PATENT DOCUMENTS

| | | | |
|---|---|---|---|
| 4,683,776 A | 8/1987 | Klemen | |
| 5,176,592 A * | 1/1993 | Nakawaki et al. | 475/278 |
| 6,176,803 B1 | 1/2001 | Meyer et al. | |
| 6,955,627 B2 | 10/2005 | Thomas et al. | |
| 6,960,149 B2 | 11/2005 | Ziemer | |
| 7,686,730 B2 | 3/2010 | Baldwin | |
| 8,177,674 B2 | 5/2012 | Baldwin | |
| 2005/0176550 A1 * | 8/2005 | Bucknor et al. | 475/275 |
| 2013/0260949 A1 * | 10/2013 | Fellmann et al. | 475/317 |

* cited by examiner

*Primary Examiner* — Jacob S Scott
(74) *Attorney, Agent, or Firm* — James Dottavio; Brooks Kushman P.C.

(57) ABSTRACT

A family of transmission gearing arrangements each establish at least one reverse gear ratio and between nine and fifteen forward gear ratios. A shiftable gearing arrangement establishes a variety of speed ratio between the input and a first shaft. In some embodiments, a fixed speed ratio is established upstream or downstream of the shiftable gearing arrangement. In reverse and low gear ratios, a low clutch couples the first shaft to the output. In the high gear ratios, a combining planetary gear set establishes a linear speed relationship between the first shaft, a second shaft rotating at a speed proportional to the input, and the output.

24 Claims, 8 Drawing Sheets

MULTI-SPEED TRANSMISSION

TECHNICAL FIELD

This disclosure relates to the field of automatic transmissions for motor vehicles. More particularly, the disclosure pertains to an arrangement of gears, clutches, and the interconnections among them in a power transmission.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising. Typically, a transmission has a housing mounted to the vehicle structure, an input shaft driven by an engine crankshaft, and an output shaft driving the vehicle wheels, often via a differential assembly which permits the left and right wheel to rotate at slightly different speeds as the vehicle turns.

SUMMARY OF THE DISCLOSURE

In one embodiment, a transmission includes an input, an output, first and second shafts, and first and second gearing arrangements. The first gearing arrangement selectively establishes a plurality of proportional speed relationships between the input and the first shaft. The second gearing arrangement i) imposes a linear speed relationship among the first shaft, the second shaft, and the output, ii) selectively couples the first shaft to the output, and iii) imposes a proportional speed relationship between the input and the second shaft. The linear speed relationship may be fixedly imposed by a planetary gear set or selectively imposed by a planetary gear set in combination with a clutch. The first shaft may be directly selectively coupled to the output by a clutch or the selective coupling may be accomplished by a planetary gear set with a first element fixedly coupled to the second shaft, a second element fixedly coupled to the output, and a clutch that selectively couples the third element to either the first element or the second element. The proportional speed relationship between the input and the second shaft may be either a fixed or selective and may be a direct drive relationship.

In a second embodiment, a transmission includes an input, an output, a first shaft, and first and second gearing arrangements. The first gearing arrangement selectively establishes a plurality of proportional speed relationships between the input and the first shaft. The second gearing i) selectively imposes a linear speed relationship among the first shaft, the input, and the output, and ii) selectively couple the first shaft to the output.

In a third embodiment, a transmission includes an output, first through seventh shafts, three gearing arrangements, and a collection of brakes and clutches. The first gearing arrangement establishes fixed proportional speed relationships among the first, second, and third shafts such that the first shaft rotates slowest of the three and the third shaft rotates fastest of the three. Either the second shaft or the third shaft may be fixedly coupled to an input. The second gearing arrangement establishes a fixed linear speed relationship among the fourth, fifth, sixth, and seventh shafts. The third gearing arrangement selectively imposes a linear speed relationship among the sixth shaft, the third shaft, and the output. The third gearing arrangement may include a planetary gear set and a high clutch. A low clutch selectively couples the sixth shaft to the output. First and second brakes selectively hold the fourth and fifth shafts, respectively, against rotation. First and second clutches selectively couple the first shaft to the fourth and seventh shafts, respectively. A third clutch selectively couples the second shaft to the fifth shaft.

DETAILED DESCRIPTION

Figure 1:
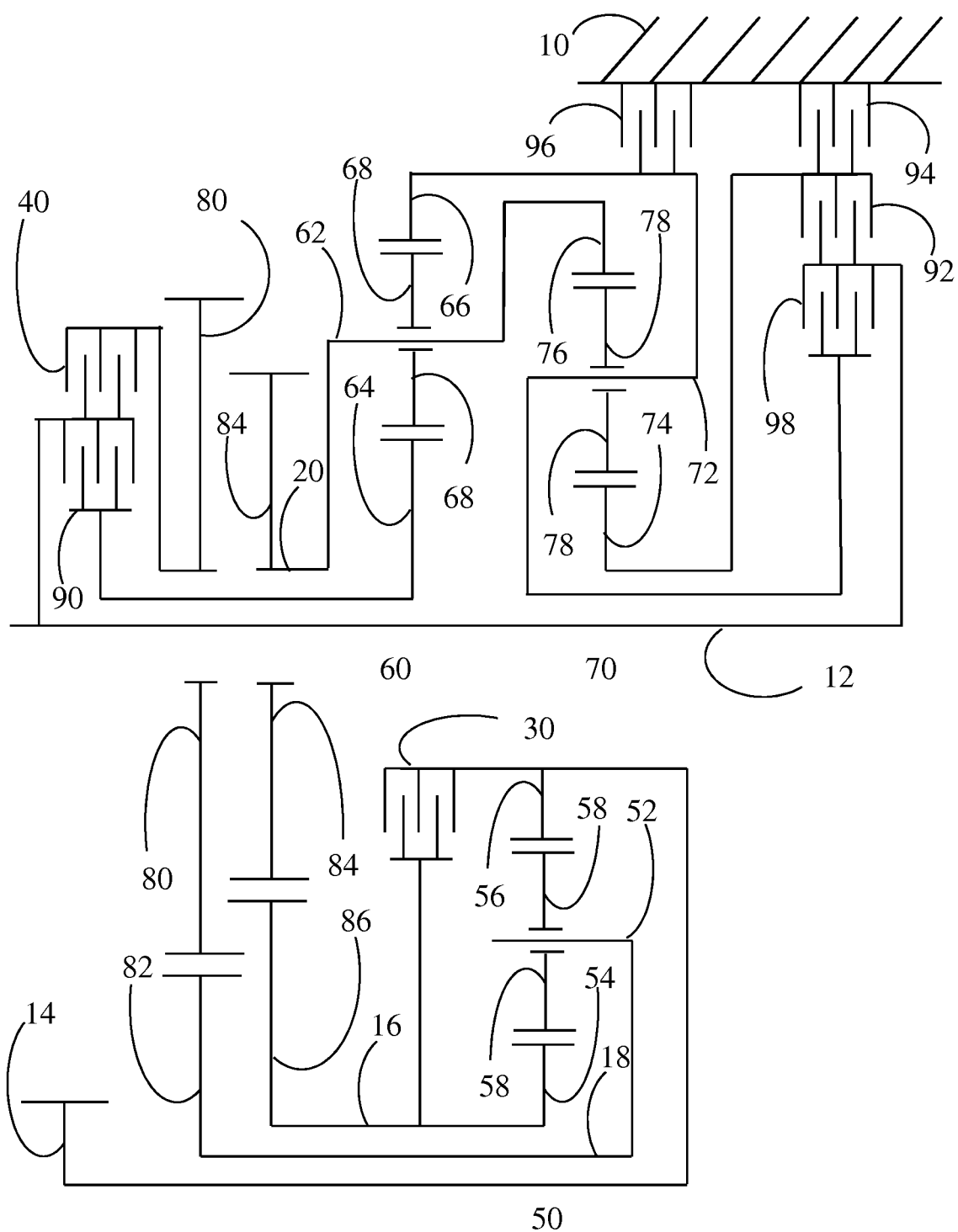
FIG. 1 is schematic view of a first transmission gearing arrangement.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A gearing arrangement is a collection of rotating elements and shift elements configured to impose specified speed relationships among the rotating elements. Some speed relationships, called fixed speed relationships, are imposed regardless of the state of any shift elements. Other speed relationships, called selective speed relationships, are imposed only when particular shift elements are fully engaged. A linear speed relationship exists among an ordered list of rotating elements when i) the first and last rotating element in the group are constrained to have the most extreme speeds, ii) the speeds of the remaining rotating elements are each constrained to be a weighted average of the first and last rotating element, and iii) when the speeds of the rotating elements differ, they are constrained to be in the listed order, either increasing or decreasing. The speed of an element is positive when the element rotates in one direction and negative when the element rotates in the opposite direction. A discrete ratio transmission has a gearing arrangement that selectively imposes a variety of speed ratios between an input shaft and an output shaft.

A group of rotating elements are fixedly coupled to one another if they are constrained to rotate as a unit in all operating conditions. Rotating elements can be fixedly coupled by spline connections, welding, press fitting, machining from a common solid, or other means. Slight variations in rotational displacement between fixedly coupled elements can occur such as displacement due to lash or shaft compliance. One or more rotating elements that are all fixedly coupled to one another may be called a shaft. In contrast, two rotating elements are selectively coupled by a shift element when the shift element constrains them to rotate as a unit whenever it is fully engaged and they are free to rotate at distinct speeds in at least some other operating condition. A shift element that holds a rotating element against rotation by selectively connecting it to the housing is called a brake. A shift element that selectively couples two or more rotating elements to one another is called a clutch. Shift elements may be actively controlled devices such as hydraulically or electrically actuated clutches or brakes or may be passive devices such as one way clutches or brakes. Two rotating elements are coupled if they are either fixedly coupled or selectively coupled.

An example transmission is schematically illustrated in FIG. 1. Transmission housing 10 is fixedly mounted with respect to the vehicle. Input 12 rotates about an input axis. Input 12 is driven by the vehicle engine, preferably via a launch device such as a torque converter that permits the engine to idle while the input 12 is stationary. Output 14 rotates about an output axis parallel to and offset from the input axis. Output 14 drives the vehicle wheels, preferably via a differential which may be located on another axis.

The transmission of FIG. 1 utilizes three simple planetary gear sets 50, 60, and 70. A planet carrier 52 rotates about the output axis and supports a set of planet gears 58 such that the planet gears rotate with respect to the planet carrier. External gear teeth on the planet gears mesh with external gear teeth on a sun gear 54 and with internal gear teeth on a ring gear 56. The sun gear and ring gear are supported to rotate about the output axis. Gear sets 60 and 70 are similarly structured except that the sun gears, carriers, and ring gears are supported for rotation about the input axis. A simple planetary gear set is a type of gearing arrangement that imposes a fixed linear speed relationship among the sun gear, the planet carrier, and the ring gear. Other known types of gearing arrangements also impose a fixed linear speed relationship among three rotating elements. For example, a double pinion planetary gear set imposes a fixed linear speed relationship between the sun gear, the ring gear, and the planet carrier.

The transmission of FIG. 1 also utilizes two pairs of axis transfer gears. Axis transfer gears 80 and 84 are supported to rotate about the input axis while axis transfer gears 82 and 86 are supported for rotation about the output axis. Axis transfer gear 80 meshes with axis transfer gear 82 while axis transfer gear 84 meshes with axis transfer gear 86. Meshing axis transfer gears impose a fixed proportional speed relationship. The gear with a greater number of gear teeth will rotate slower than, and in the opposite direction from, the gear with fewer gear teeth. Illustrative ratios of gear teeth for each axis transfer gear set and each planetary gear set are listed in Table 1.

TABLE 1

| Gear 82/Gear 80 | 1.034 |
|---|---|
| Gear 86/Gear 84 | 1.593 |
| Ring 56/Sun 54 | 1.750 |

TABLE 1-continued

| Ring 66/Sun 64 | 1.816 |
|---|---|
| Ring 76/Sun 74 | 2.649 |

In the transmission of FIG. 1, axis transfer gear 86 is fixedly coupled to sun gear 54 by first shaft 16. Axis transfer gear 82 is fixedly coupled to carrier 52 by second shaft 18. Output 14 is fixedly coupled to ring gear 56. Axis transfer gear 84, carrier 62, and ring gear 76 are fixedly coupled by third shaft 20. Ring gear 66 is fixedly coupled to carrier 72. Shaft 16 is selectively coupled to output 14 by low clutch 30. Input 12 is selectively coupled to axis transfer gear 80 by high clutch 40 and selectively coupled to sun gear 64 by first clutch 90. Sun gear 74 is selectively coupled to input 12 by second clutch 92 and selectively held against rotation by first brake 94. Finally, the combination of ring gear 66 and carrier 72 is selectively held against rotation by second brake 96 and selectively coupled to input 12 by third clutch 98. The terms low clutch and high clutch are labels only and do not imply a physical location.

As shown in Table 2, engaging the shift elements in combinations of three establishes eleven forward speed ratios and one reverse speed ratio between input shaft 12 and output shaft 14. An X indicates that the shift element transmits torque in that speed ratio. An (X) indicates the clutch can be applied but is not required to establish the speed ratio. In 5th gear, clutches 30 and 40 establish the power flow path between input 12 and output 14. Any one of the remaining shift elements may also be applied. Applying clutch 98 in 5th gear ensures that all single and two step shifts from 5th gear can be accomplished by engaging only one shift element and releasing only one shift element. When the gear sets have tooth number ratios as indicated in Table 1, the speed ratios have the values indicated in Table 2. Note that the speed ratio is positive in reverse and negative in the forward ratios. An additional axis transfer gear pair between output 14 and the differential causes the wheels to rotate in the same direction as the input in forward and in the opposite direction in reverse.

TABLE 2

| | 30 | 40 | 90 | 92 | 94 | 96 | 98 | Ratio | Step |
|---|---|---|---|---|---|---|---|---|---|
| Rev | X | | | X | | X | | 4.22 | 94% |
| $1^{st}$ | X | | X | | | X | | −4.49 | |
| $2^{nd}$ | X | | X | | X | | | −2.39 | 1.88 |
| $3^{rd}$ | X | | X | | | | X | −1.59 | 1.50 |
| $4^{th}$ | X | | | | X | | X | −1.15 | 1.38 |
| $5^{th}$ | X | X | | | | | (X) | −1.03 | 1.12 |
| $6^{th}$ | | X | | | X | | X | −0.97 | 1.06 |
| $7^{th}$ | | X | X | | | | X | −0.86 | 1.13 |
| $8^{th}$ | | X | X | | X | | | −0.78 | 1.10 |
| $9^{th}$ | | X | X | | | X | | −0.72 | 1.09 |
| $10^{th}$ | | X | | | X | X | | −0.66 | 1.09 |
| $11^{th}$ | | X | | X | | X | | −0.60 | 1.09 |

Various combinations of gear sets and shift elements impose particular speed relationships. The combination of planetary gear sets 60 and 70 and shift elements 90, 92, 94, 96, and 98 selectively impose a plurality of proportional speed relationships between input 12 and third shaft 20. Specifically, engaging the shift elements in various combinations of two imposes one reverse speed relationship, two underdrive speed relationships, a direct drive speed relationship, and one overdrive speed relationship. The combination of these components and axis transfer gears 84 and 86 selectively impose a plurality of speed relationships between input 12 and first shaft 16. Combining planetary gear set 50 imposes a fixed linear speed relationship among first shaft 16, second shaft 18, and output 14. The combination of high clutch 40 and axis transfer gears 80 and 82 selectively establish a proportional speed relationship between input 12 and second shaft 18. In other words, when clutch 40 is engaged, shaft 18 is constrained to rotate at a speed proportional to input 12.

Figure 2:
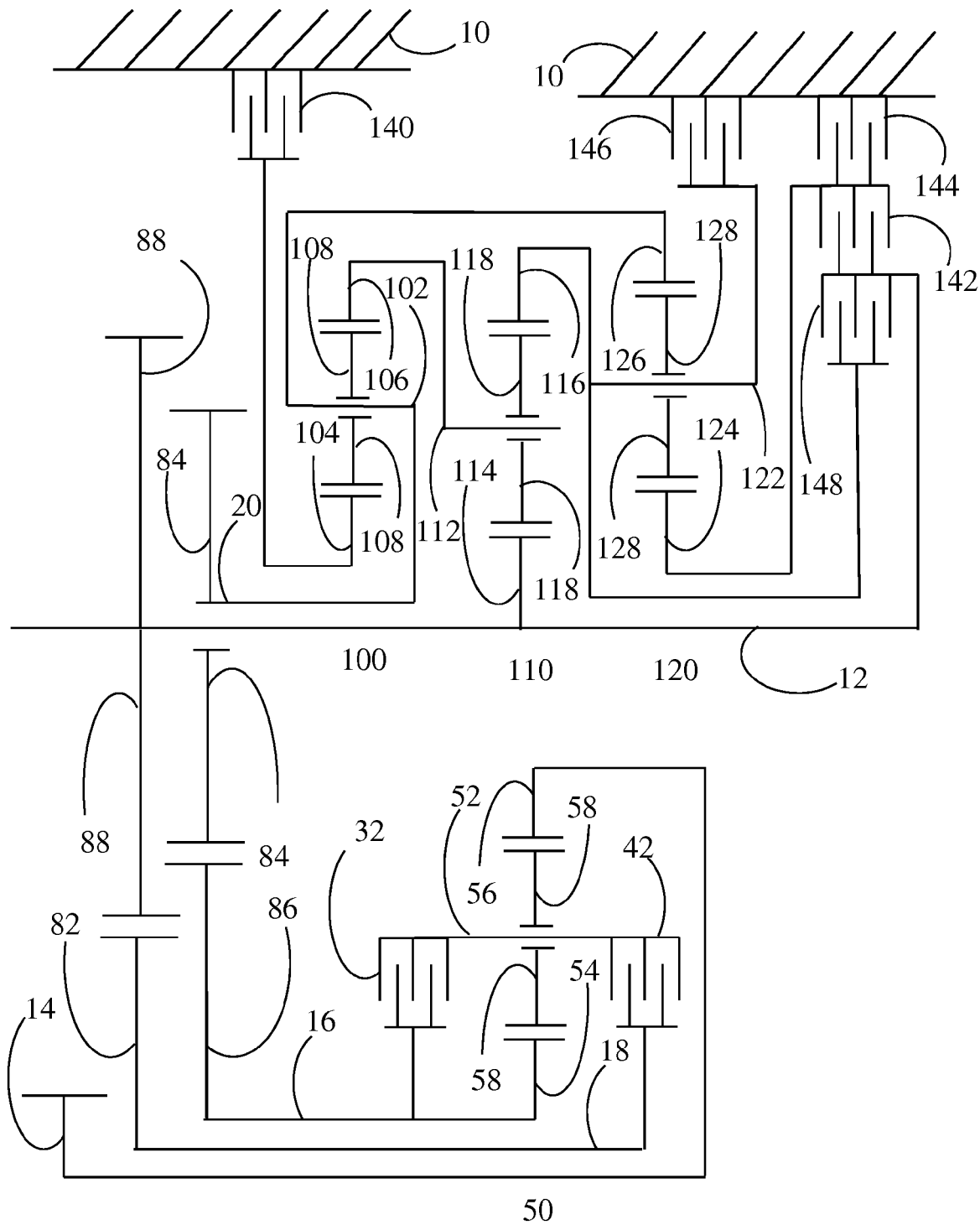
FIG. 2 is schematic view of a second transmission gearing arrangement.

Another example transmission is schematically illustrated in FIG. 2. The transmission of FIG. 2 utilizes four simple planetary gear sets 50, 100, 110, and 120 and two pairs of axis transfer gears, 88 and 82 and 84 and 86. Illustrative ratios of gear teeth for each axis transfer gear set and each planetary gear set are listed in Table 3.

TABLE 3

| | |
|---|---|
| Gear 82/Gear 88 | 1.000 |
| Gear 86/Gear 84 | 1.471 |
| Ring 56/Sun 54 | 2.500 |
| Ring 106/Sun 114 | 2.243 |
| Ring 116/Sun 114 | 2.171 |
| Ring 126/Sun 124 | 2.943 |

In the transmission of FIG. 2, axis transfer gear 86 is fixedly coupled to sun gear 54 by first shaft 16. Output 14 is fixedly coupled to ring gear 56. Axis transfer gear 88 and sun gear 114 are fixedly coupled to input 12. Axis transfer gear 84, carrier 102, and ring gear 126 are fixedly coupled by third shaft 20. Ring gear 106 is fixedly coupled to carrier 112. Ring gear 116 is fixedly coupled to carrier 122. Carrier 52 is selectively directly coupled to shaft 16 by low clutch 32 and selectively coupled to shaft 18 by high clutch 42. Sun gear 104 is selectively held against rotation by first brake 140. Sun gear 124 is selectively coupled to input 12 by first clutch 142 and selectively held against rotation by second brake 144. Finally, the combination of ring gear 116 and carrier 122 is selectively held against rotation by third brake 146 and selectively coupled to input 12 by second clutch 148.

As shown in Table 4, engaging the shift elements in combinations of three establishes fifteen forward speed ratios and one reverse speed ratio between input shaft 12 and output shaft 14. When the gear sets have tooth number ratios as indicated in Table 3, the speed ratios have the values indicated in Table 4. Note that the speed ratio is positive in reverse and negative in the forward ratios. An additional axis transfer gear pair between output 14 and the differential causes the wheels to rotate in the same direction as the input in forward and in the opposite direction in reverse.

TABLE 4

| | 32 | 42 | 140 | 142 | 144 | 146 | 148 | Ratio | Step |
|---|---|---|---|---|---|---|---|---|---|
| Rev | X | | | X | | X | | 4.33 | 64% |
| 1$^{st}$ | X | | X | | | X | | −6.74 | |
| 2$^{nd}$ | X | | X | | X | | | −4.36 | 1.55 |
| 3$^{rd}$ | X | | X | X | | | | −2.81 | 1.55 |
| 4$^{th}$ | X | | X | | | | X | −2.13 | 1.32 |
| 5$^{th}$ | X | | | | X | | X | −1.47 | 1.45 |
| 6$^{th}$ | X | | | | | X | X | −1.10 | 1.34 |
| 7$^{th}$ | X | X | | | | | X | −1.00 | 1.10 |
| 8$^{th}$ | | X | | | X | | X | −0.97 | 1.04 |
| 9$^{th}$ | | X | | X | | | X | −0.89 | 1.09 |
| 10$^{th}$ | | X | X | | | | X | −0.83 | 1.07 |
| 11$^{th}$ | | X | X | X | | | | −0.80 | 1.04 |
| 12$^{th}$ | | X | X | | X | | | −0.76 | 1.04 |
| 13$^{th}$ | | X | X | X | | X | | −0.75 | 1.03 |
| 14$^{th}$ | | X | | | | X | X | −0.71 | 1.04 |
| 15$^{th}$ | | X | | | X | | X | −0.67 | 1.07 |

Various combinations of gear sets and shift elements impose particular speed relationships. The combination of planetary gear sets 100, 110, and 120 and shift elements 140, 142, 144, 146, and 148 selectively impose a plurality of proportional speed relationships between input 12 and third shaft 20. Specifically, engaging the shift elements in various combinations of two imposes one reverse speed relationship, four underdrive speed relationships, a direct drive speed relationship, and one overdrive speed relationship. The combination of these components and axis transfer gears 84 and 86 selectively impose a plurality of speed relationships between input 12 and first shaft 16. Axis transfer gears 80 and 82 establish a fixed proportional speed relationship between input 12 and second shaft 18. Combining planetary gear set 50, low clutch 32, and high clutch 42 collectively impose two selective speed relationships. First, when low clutch 32 is engaged, first shaft 16 is operatively coupled to output 14 because all of the elements of simple planetary gear set 50 rotate as a unit. Second, when high clutch 42 is engaged, a linear speed relationship is imposed among first shaft 16, second shaft 18, and output 14.

Figure 3:
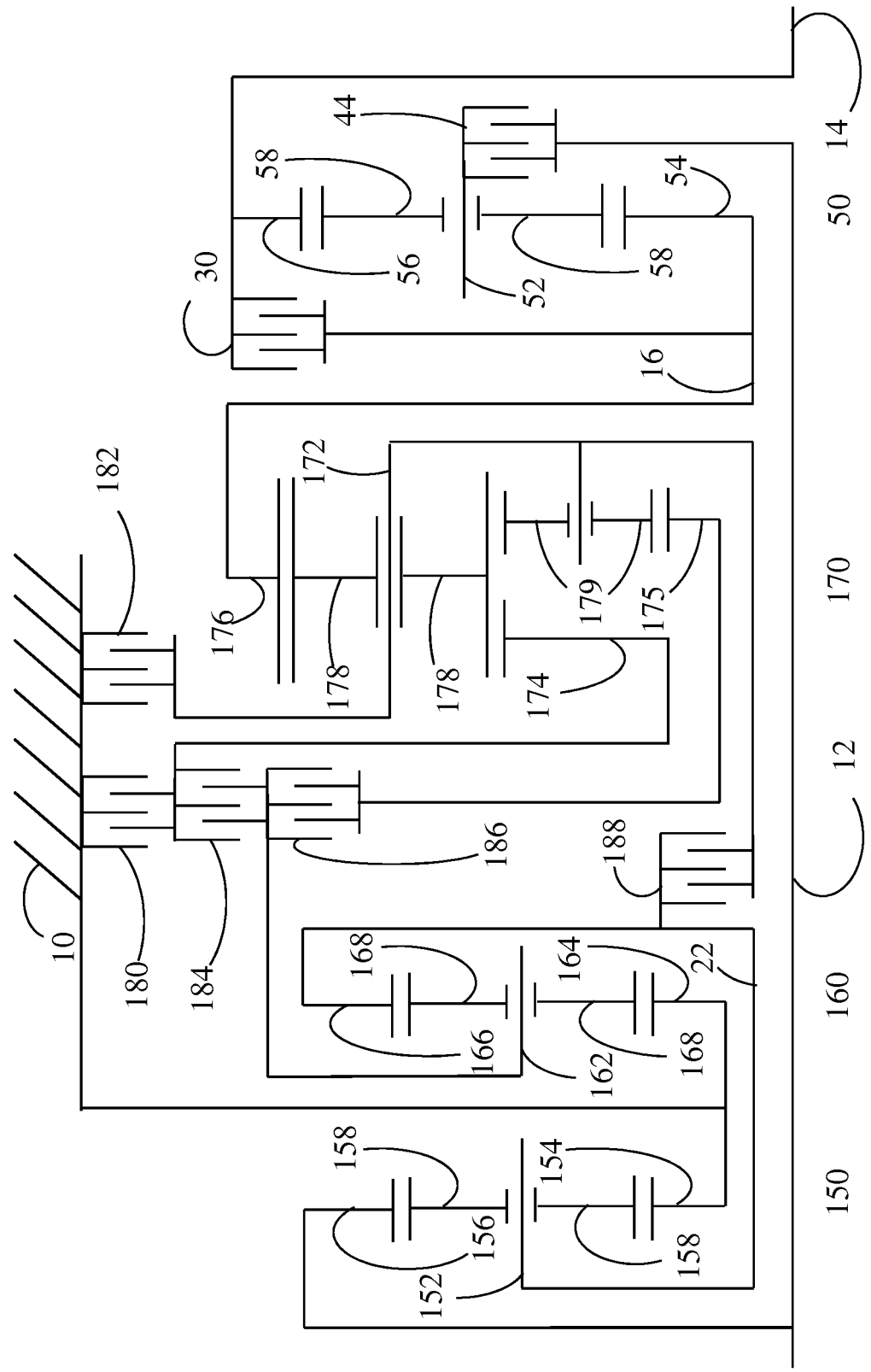
FIG. 3 is schematic view of a third transmission gearing arrangement.

Another example transmission is schematically illustrated in FIG. 3. In the transmission of FIG. 3, input 12 and output 14 rotate about a common axis. The transmission of FIG. 3 utilizes three simple planetary gear sets 50, 150, and 160 and a Ravigneaux gear set 170. Planet carrier 172 supports two set of planet gears. External gear teeth on long planet gears 178 mesh with external gear teeth on sun gear 174 and with internal gear teeth on ring gear 176. External gear teeth on short planet gears 179 mesh with external gear teeth on sun gear 175 and with the external gear teeth on the long planet gears 178. Carrier 172, sun gears 174 and 175, and ring gear 176 are each supported to rotate about a common axis. Ravigneaux gear set 170 imposes a fixed linear speed relationship among sun gear 174, planet carrier 172, ring gear 176, and sun 175. Other known types of gearing arrangements also impose a fixed linear speed relationship among four rotating elements. For example, two planetary gear sets, each either simple or double pinion type, wherein two elements of one gear set are fixedly coupled to two elements of the other gear set, collectively impose a fixed linear speed relationship between four shafts. Illustrative ratios of gear teeth for each gear set of FIG. 3 are listed in Table 5.

TABLE 5

| | |
|---|---|
| Ring 56/Sun 54 | 1.842 |
| Ring 156/Sun 154 | 1.634 |
| Ring 166/Sun 164 | 1.919 |
| Ring 176/Sun 174 | 2.237 |
| Ring 176/Sun 175 | 2.742 |

In the transmission of FIG. 3, sun gears 154 and 164 are fixedly held against rotation. Input 12 is fixedly coupled to ring gear 156. Carrier 152 is fixedly coupled to ring gear 166 by fourth shaft 22. Ring gear 176 is fixedly coupled to sun gear 54 by first shaft 16. Output 14 is fixedly coupled to ring gear 56 and selectively directly coupled to shaft 16 by low clutch 30. Carrier 52 is selectively coupled to input 12 by high clutch 44. Sun gear 174 is selectively held against rotation by first brake 180. Carrier 162 is selectively coupled to sun gear 174 by first clutch 184 and selectively coupled to sun gear 175 by second clutch 186. Finally, carrier 172 is selectively held against rotation by second brake 182 and selectively coupled to fourth shaft 22 by third clutch 188.

As shown in Table 6, engaging the shift elements in combinations of three establishes fifteen forward speed ratios and one reverse speed ratio between input shaft 12 and output shaft 14. When the gear sets have tooth number ratios as indicated in Table 5, the speed ratios have the values indicated in Table 6.

TABLE 6

|   | 30 | 44 | 180 | 182 | 184 | 186 | 188 | Ratio | Step |
|---|---|---|---|---|---|---|---|---|---|
| Rev | X |  |  | X | X |  |  | −5.49 | 82% |
| 1st | X |  |  | X |  | X |  | 6.72 |  |
| 2nd | X | X |  |  |  |  | X | 3.77 | 1.78 |
| 3rd | X |  |  |  | X | X |  | 2.45 | 1.54 |
| 4th | X |  |  |  | X |  | X | 1.84 | 1.33 |
| 5th | X |  |  |  |  | X | X | 1.40 | 1.32 |
| 6th | X |  | X |  |  |  | X | 1.11 | 1.26 |
| 7th | X | X |  |  |  |  | X | 1.00 | 1.11 |
| 8th |  | X | X |  |  |  | X | 0.95 | 1.06 |
| 9th |  | X |  |  |  | X | X | 0.87 | 1.09 |
| 10th |  | X |  |  | X |  | X | 0.80 | 1.08 |
| 11th |  | X |  |  | X | X |  | 0.76 | 1.06 |
| 12th |  | X | X |  |  | X |  | 0.72 | 1.06 |
| 13th |  | X |  | X |  |  | X | 0.68 | 1.05 |
| 14th |  | X | X | X |  |  |  | 0.65 | 1.06 |
| 15th |  | X |  | X | X |  |  | 0.61 | 1.06 |

Various combinations of gear sets and shift elements impose particular speed relationships. The combination of gear sets 160 and 170 and shift elements 180, 182, 184, 186, and 188 selectively impose a plurality of proportional speed relationships between fourth shaft 22 and first shaft 16. Specifically, engaging the shift elements in various combinations of two imposes one reverse speed relationship, four underdrive speed relationships, and two overdrive speed relationships. Gear set 150 establishes a fixed underdrive speed relationship between input 12 and fourth shaft 22. In combination, these components impose a plurality of speed relationships between input 12 and first shaft 16. Combining planetary gear set 50 and high clutch 44 collectively selectively establish a linear speed relationship among first shaft 16, input 12, and output 14.

Figure 4:
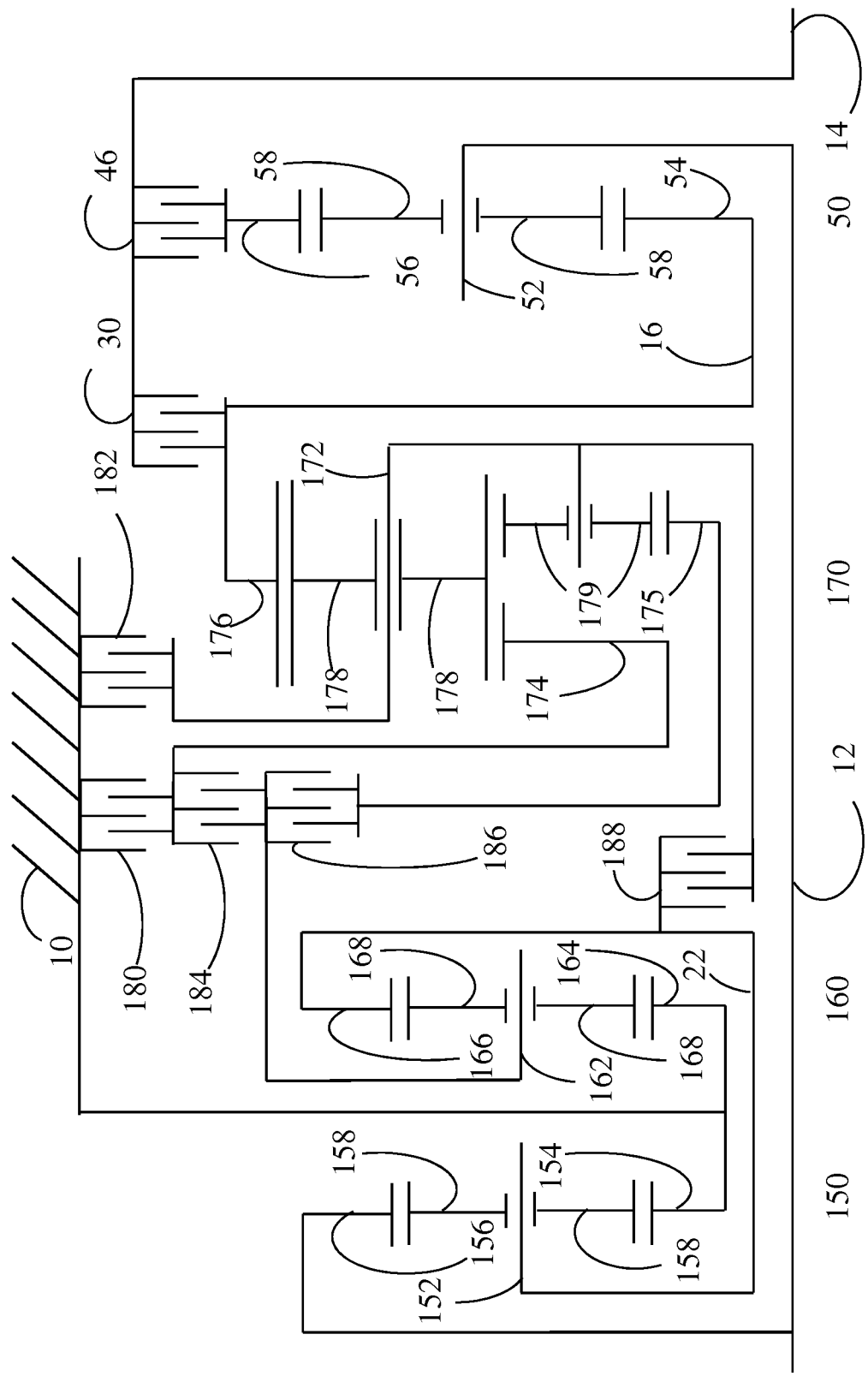
FIG. 4 is schematic view of a fourth transmission gearing arrangement.

Another example transmission is schematically illustrated in FIG. 4. The transmission of FIG. 4, like the transmission of FIG. 3, utilizes three simple planetary gear sets 50, 150, and 160 and a Ravigneaux gear set 170. Illustrative ratios of gear teeth for each gear set are listed in Table 5.

In the transmission of FIG. 4, sun gears 154 and 164 are fixedly held against rotation. Input 12 is fixedly coupled to ring gear 156 and fixedly coupled to carrier 52. Carrier 152 is fixedly coupled to ring gear 166 by fourth shaft 22. Ring gear 176 is fixedly coupled to sun gear 54 by first shaft 16. Output 14 is selectively directly coupled to shaft 16 by low clutch 30 and selectively coupled to ring gear 56 by high clutch 46. Sun gear 174 is selectively held against rotation by first brake 180. Carrier 162 is selectively coupled to sun gear 174 by first clutch 184 and selectively coupled to sun gear 175 by second clutch 186. Finally, carrier 172 is selectively held against rotation by second brake 182 and selectively coupled to fourth shaft 22 by third clutch 188.

As shown in Table 7, engaging the shift elements in combinations of three establishes fifteen forward speed ratios and one reverse speed ratio between input shaft 12 and output shaft 14. When the gear sets have tooth number ratios as indicated in Table 5, the speed ratios have the values indicated in Table 7.

TABLE 7

|   | 30 | 46 | 180 | 182 | 184 | 186 | 188 | Ratio | Step |
|---|---|---|---|---|---|---|---|---|---|
| Rev | X |  |  | X | X |  |  | −5.49 | 82% |
| 1st | X |  |  | X |  | X |  | 6.72 |  |
| 2nd | X | X |  |  |  |  | X | 3.77 | 1.78 |

TABLE 7-continued

|   | 30 | 46 | 180 | 182 | 184 | 186 | 188 | Ratio | Step |
|---|---|---|---|---|---|---|---|---|---|
| 3rd | X |  |  |  | X | X |  | 2.45 | 1.54 |
| 4th | X |  |  |  | X |  | X | 1.84 | 1.33 |
| 5th | X |  |  |  |  | X | X | 1.40 | 1.32 |
| 6th | X |  | X |  |  |  | X | 1.11 | 1.26 |
| 7th | X | X |  |  |  |  | X | 1.00 | 1.11 |
| 8th |  | X | X |  |  |  | X | 0.95 | 1.06 |
| 9th |  | X |  |  |  | X | X | 0.87 | 1.09 |
| 10th |  | X |  |  | X |  | X | 0.80 | 1.08 |
| 11th |  | X |  |  | X | X |  | 0.76 | 1.06 |
| 12th |  | X | X |  |  | X |  | 0.72 | 1.06 |
| 13th |  | X |  | X |  |  | X | 0.68 | 1.05 |
| 14th |  | X | X | X |  |  |  | 0.65 | 1.06 |
| 15th |  | X |  | X | X |  |  | 0.61 | 1.06 |

Various combinations of gear sets and shift elements impose particular speed relationships. The combination of gear sets 160 and 170 and shift elements 180, 182, 184, 186, and 188 selectively impose a plurality of proportional speed relationships between fourth shaft 22 and first shaft 16. Specifically, engaging the shift elements in various combinations of two imposes one reverse speed relationship, four underdrive speed relationships, and two overdrive speed relationships. Gear set 150 establishes a fixed underdrive speed relationship between input 12 and fourth shaft 22. In combination, these components impose a plurality of speed relationships between input 12 and first shaft 16. Gear sets 150 and 160 collectively establish fixed proportional speed relationships among i) carrier 162, ii) the combination of carrier 152 and ring gear 166, and iii) ring gear 156 such that ring gear 156 rotates faster than the other two and carrier 162 rotates slower than the other two. Combining planetary gear set 50 and high clutch 46 collectively selectively establish a linear speed relationship among first shaft 16, input 12, and output 14.

Figure 5:
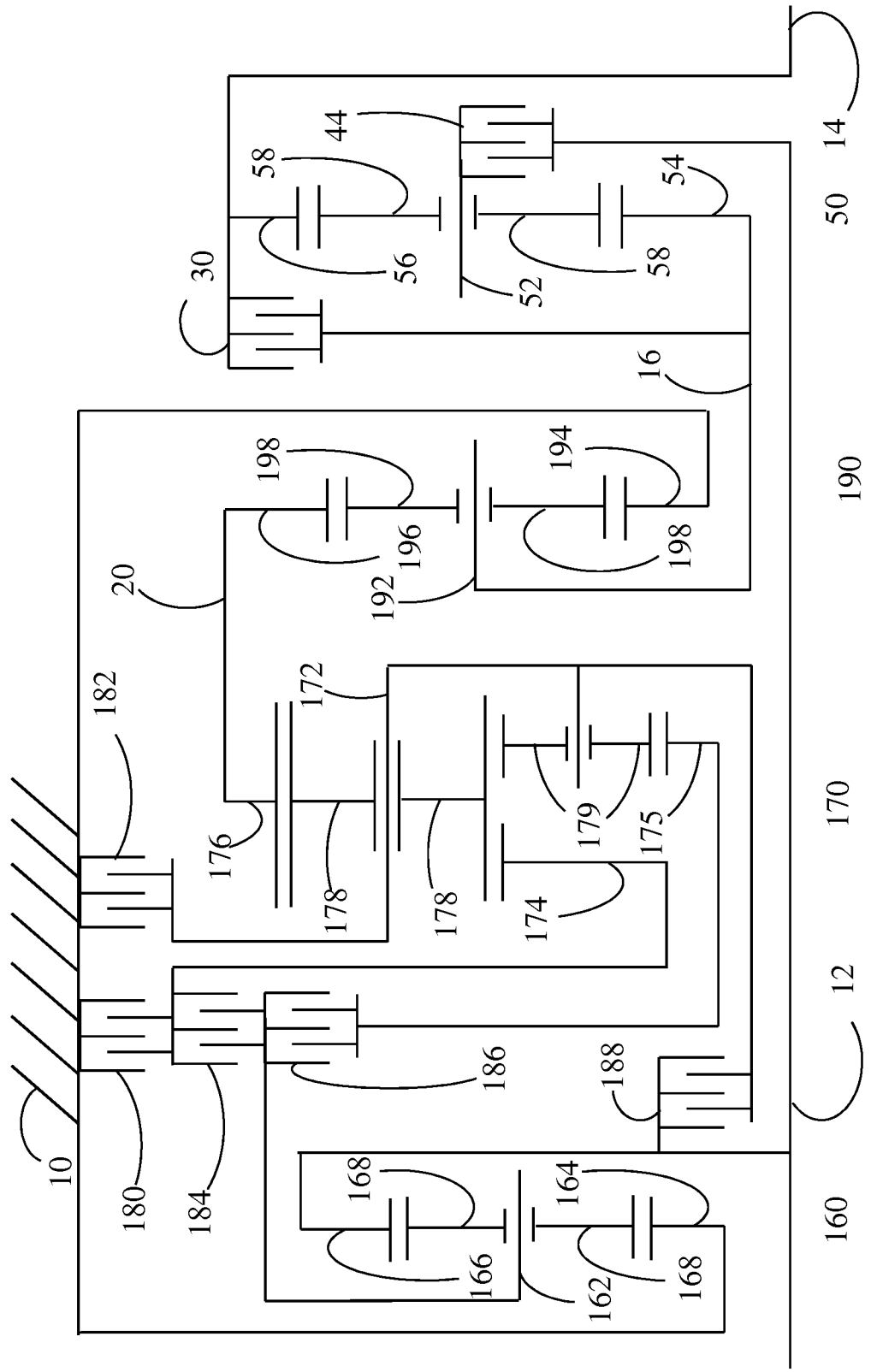
FIG. 5 is schematic view of a fifth transmission gearing arrangement.

Another example transmission is schematically illustrated in FIG. 5. The transmission of FIG. 5 utilizes three simple planetary gear sets 50, 160, and 190 and a Ravigneaux gear set 170. Illustrative ratios of gear teeth for each gear set of FIG. 5 are listed in Table 8.

TABLE 8

| Ring 56/Sun 54 | 1.842 |
|---|---|
| Ring 166/Sun 164 | 1.919 |
| Ring 176/Sun 174 | 2.237 |
| Ring 176/Sun 175 | 2.742 |
| Ring 196/Sun 194 | 1.634 |

In the transmission of FIG. 5, sun gears 164 and 194 are fixedly held against rotation. Input 12 is fixedly coupled to ring gear 166. Ring gear 176 is fixedly coupled to ring gear 196 by third shaft 20. Carrier 192 is fixedly coupled to sun gear 54 by first shaft 16. Output 14 is fixedly coupled to ring gear 56 and selectively directly coupled to shaft 16 by low clutch 30. Carrier 52 is selectively coupled to input 12 by high clutch 44. Sun gear 174 is selectively held against rotation by first brake 180. Carrier 162 is selectively coupled to sun gear 174 by first clutch 184 and selectively coupled to sun gear 175 by second clutch 186. Finally, carrier 172 is selectively held against rotation by second brake 182 and selectively coupled to input 12 by third clutch 188.

As shown in Table 6, engaging the shift elements in combinations of three establishes fifteen forward speed ratios and one reverse speed ratio between input shaft 12 and output shaft 14. When the gear sets have tooth number ratios as indicated in Table 8, the speed ratios have the values indicated in Table 6.

Various combinations of gear sets and shift elements impose particular speed relationships. The combination of gear sets 160 and 170 and shift elements 180, 182, 184, 186, and 188 selectively impose a plurality of proportional speed relationships between input 12 and third shaft 20. Specifically, engaging the shift elements in various combinations of two imposes one reverse speed relationship, four underdrive speed relationships, and two overdrive speed relationships. Gear set 190 establishes a fixed underdrive speed relationship between third shaft 20 and first shaft 16. In combination, these components impose a plurality of speed relationships between input 12 and first shaft 16. Combining planetary gear set 50 and high clutch 44 collectively selectively establish a linear speed relationship among first shaft 16, input 12, and output 14.

Figure 6:
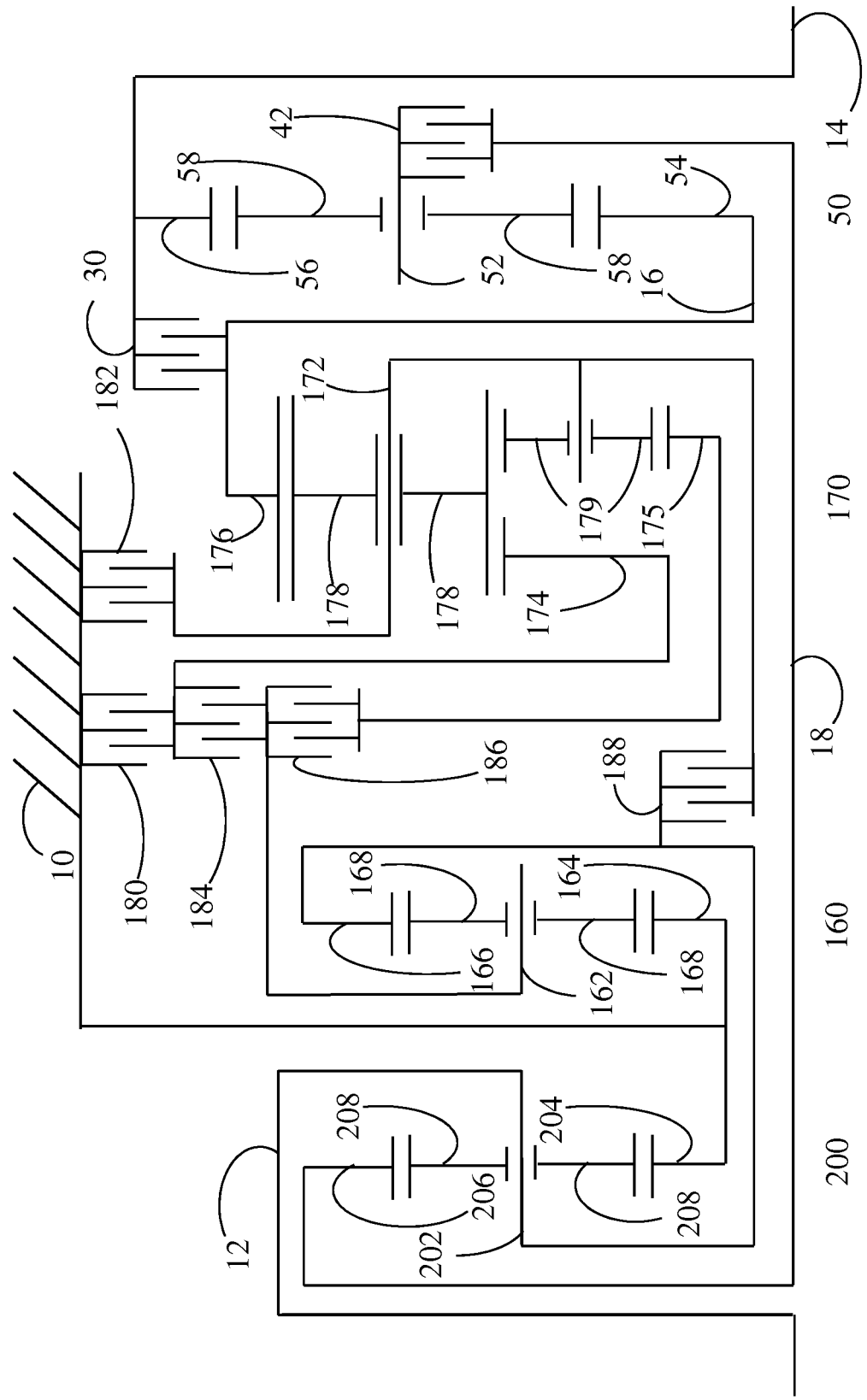
FIG. 6 is schematic view of a sixth transmission gearing arrangement.

Another example transmission is schematically illustrated in FIG. 6. The transmission of FIG. 6 utilizes three simple planetary gear sets 50, 160, and 200 and a Ravigneaux gear set 170. Illustrative ratios of gear teeth for each gear set of FIG. 6 are listed in Table 9.

TABLE 9

| Ring 56/Sun 54 | 1.842 |
| Ring 166/Sun 164 | 1.919 |
| Ring 176/Sun 174 | 2.237 |
| Ring 176/Sun 175 | 2.742 |
| Ring 206/Sun 204 | 1.634 |

In the transmission of FIG. 6, sun gears 164 and 204 are fixedly held against rotation. Input 12 is fixedly coupled to carrier 202 and to ring gear 166. Second shaft 18 is fixedly coupled to ring gear 206. Ring gear 176 is fixedly coupled to sun gear 54 by first shaft 16. Output 14 is fixedly coupled to ring gear 56 and selectively directly coupled to shaft 16 by low clutch 30. Carrier 52 is selectively coupled to second shaft 18 by high clutch 42. Sun gear 174 is selectively held against rotation by first brake 180. Carrier 162 is selectively coupled to sun gear 174 by first clutch 184 and selectively coupled to sun gear 175 by second clutch 186. Finally, carrier 172 is selectively held against rotation by second brake 182 and selectively coupled to input 12 by third clutch 188.

As shown in Table 10, engaging the shift elements in combinations of three establishes fifteen forward speed ratios and one reverse speed ratio between input shaft 12 and output shaft 14. When the gear sets have tooth number ratios as indicated in Table 9, the speed ratios have the values indicated in Table 10.

TABLE 10

|  | 30 | 42 | 180 | 182 | 184 | 186 | 188 | Ratio | Step |
|---|---|---|---|---|---|---|---|---|---|
| Rev | X |  |  | X | X |  |  | -3.40 | 82% |
| $1^{st}$ | X |  |  | X |  | X |  | 4.17 |  |
| $2^{nd}$ | X |  | X |  |  | X |  | 2.34 | 1.78 |
| $3^{rd}$ | X |  |  |  | X | X |  | 1.52 | 1.54 |
| $4^{th}$ | X |  |  |  |  | X | X | 1.14 | 1.33 |
| $5^{th}$ | X |  |  |  | X |  | X | 0.87 | 1.32 |
| $6^{th}$ | X | X |  |  |  |  | X | 0.69 | 1.26 |
| $7^{th}$ | X | X |  |  |  |  | X | 0.62 | 1.11 |
| $8^{th}$ |  | X | X |  |  |  | X | 0.59 | 1.06 |
| $9^{th}$ |  | X |  |  | X |  | X | 0.54 | 1.09 |
| $10^{th}$ |  | X |  |  |  | X | X | 0.50 | 1.08 |
| $11^{th}$ |  | X |  |  | X | X |  | 0.47 | 1.06 |
| $12^{th}$ |  | X | X |  |  | X |  | 0.44 | 1.06 |
| $13^{th}$ |  | X |  | X |  | X |  | 0.42 | 1.05 |
| $14^{th}$ |  | X | X | X |  |  |  | 0.40 | 1.06 |
| $15^{th}$ |  | X |  | X | X |  |  | 0.38 | 1.06 |

Various combinations of gear sets and shift elements impose particular speed relationships. The combination of gear sets 160 and 170 and shift elements 180, 182, 184, 186, and 188 selectively impose a plurality of proportional speed relationships between input 12 and first shaft 16. Specifically, engaging the shift elements in various combinations of two imposes one reverse speed relationship, four underdrive speed relationships, and two overdrive speed relationships. Gear set 200 establishes a fixed overdrive speed relationship between input 12 and second shaft 18. Gear sets 200 and 160 collectively establish fixed proportional speed relationships among i) carrier 162, ii) the combination of input 12, carrier 202, and ring gear 166, and iii) ring gear 206 such that ring gear 206 rotates faster than the other two and carrier 162 rotates slower than the other two. Combining planetary gear set 50 and high clutch 42 collectively selectively establish a linear speed relationship among first shaft 16, second shaft 18, and output 14.

Figure 7:
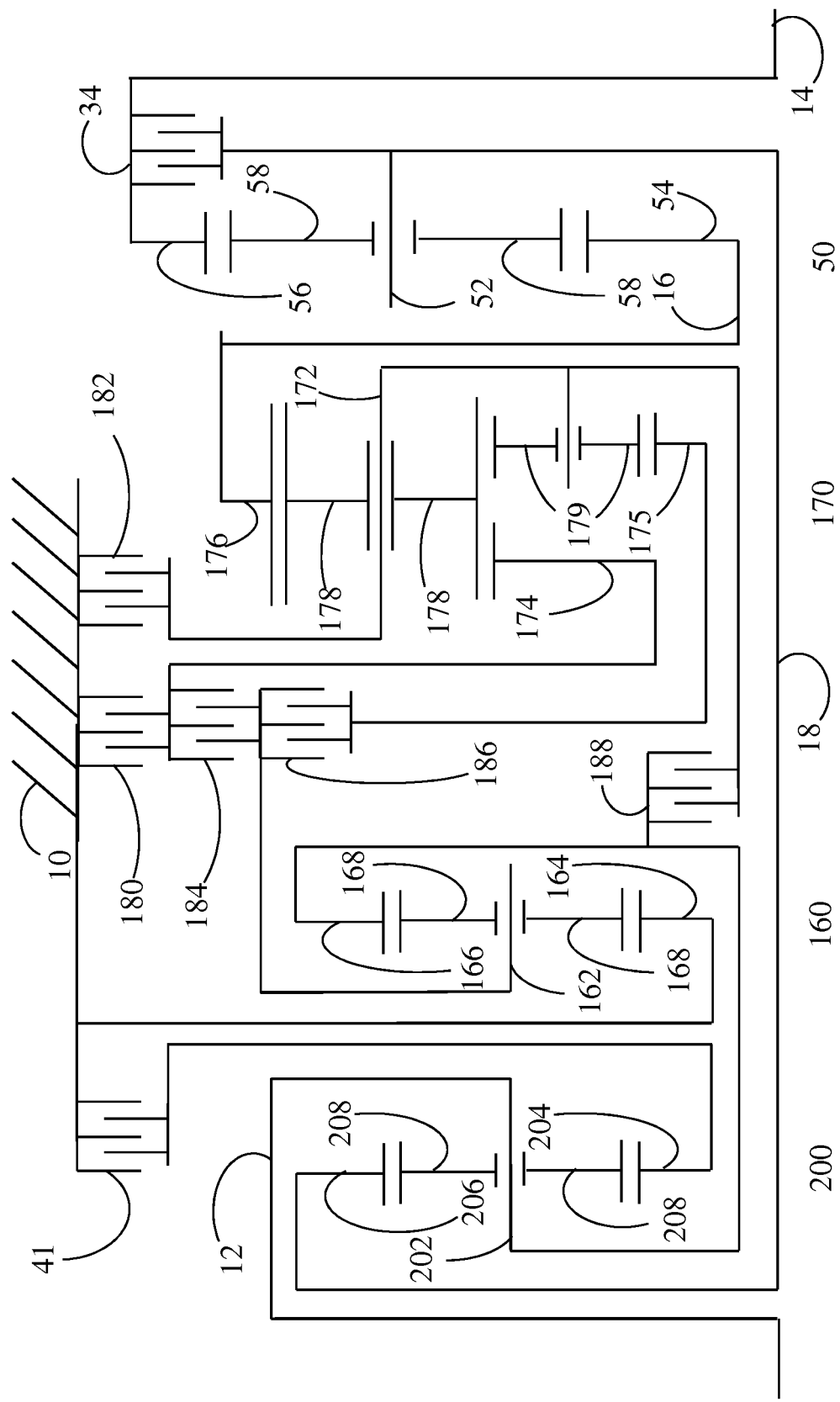
FIG. 7 is schematic view of a seventh transmission gearing arrangement.

Another example transmission is schematically illustrated in FIG. 7. The transmission of FIG. 7 utilizes three simple planetary gear sets 50, 160, and 200 and a Ravigneaux gear set 170. Illustrative ratios of gear teeth for each gear set of FIG. 7 are listed in Table 9.

In the transmission of FIG. 7, sun gear 164 is fixedly held against rotation. Input 12 is fixedly coupled to carrier 202 and to ring gear 166. Ring gear 206 is fixedly coupled to carrier 52 by second shaft 18. Ring gear 176 is fixedly coupled to sun gear 54 by first shaft 16. Output 14 is fixedly coupled to ring gear 56 and selectively coupled to carrier 52 by low clutch 34. Sun gear 204 is selectively held against rotation by high brake 41. Sun gear 174 is selectively held against rotation by first brake 180. Carrier 162 is selectively coupled to sun gear 174 by first clutch 184 and selectively coupled to sun gear 175 by second clutch 186. Finally, carrier 172 is selectively held against rotation by second brake 182 and selectively coupled to input 12 by third clutch 188.

As shown in Table 11, engaging the shift elements in combinations of three establishes fifteen forward speed ratios and one reverse speed ratio between input shaft 12 and output shaft 14. When the gear sets have tooth number ratios as indicated in Table 9, the speed ratios have the values indicated in Table 11.

TABLE 11

|  | 34 | 41 | 180 | 182 | 184 | 186 | 188 | Ratio | Step |
|---|---|---|---|---|---|---|---|---|---|
| Rev | X |  |  | X | X |  |  | -3.40 | 82% |
| $1^{st}$ | X |  |  | X |  | X |  | 4.17 |  |
| $2^{nd}$ | X |  | X |  |  | X |  | 2.34 | 1.78 |
| $3^{rd}$ | X |  |  |  | X | X |  | 1.52 | 1.54 |
| $4^{th}$ | X |  |  |  |  | X | X | 1.14 | 1.33 |
| $5^{th}$ | X |  |  |  | X |  | X | 0.87 | 1.32 |
| $6^{th}$ | X |  | X |  |  |  | X | 0.69 | 1.26 |
| $7^{th}$ | X | X |  |  |  |  | X | 0.62 | 1.11 |
| $8^{th}$ |  | X | X |  |  |  | X | 0.59 | 1.06 |
| $9^{th}$ |  | X |  |  | X |  | X | 0.54 | 1.09 |
| $10^{th}$ |  | X |  |  |  | X | X | 0.50 | 1.08 |
| $11^{th}$ |  | X |  |  | X | X |  | 0.47 | 1.06 |
| $12^{th}$ |  | X | X |  |  | X |  | 0.44 | 1.06 |
| $13^{th}$ |  | X |  | X |  | X |  | 0.42 | 1.05 |
| $14^{th}$ |  | X | X | X |  |  |  | 0.40 | 1.06 |
| $15^{th}$ |  | X |  | X | X |  |  | 0.38 | 1.06 |

Various combinations of gear sets and shift elements impose particular speed relationships. The combination of gear sets 160 and 170 and shift elements 180, 182, 184, 186, and 188 selectively impose a plurality of proportional speed relationships between input 12 and first shaft 16. Specifically, engaging the shift elements in various combinations of two imposes one reverse speed relationship, four underdrive speed relationships, and two overdrive speed relationships. Gear set 200 and high brake 41 selectively establish an overdrive speed relationship between input 12 and second shaft 18. Combining planetary gear set 50 and low clutch 34 collectively selectively couple output 14 to first shaft 16.

Figure 8:
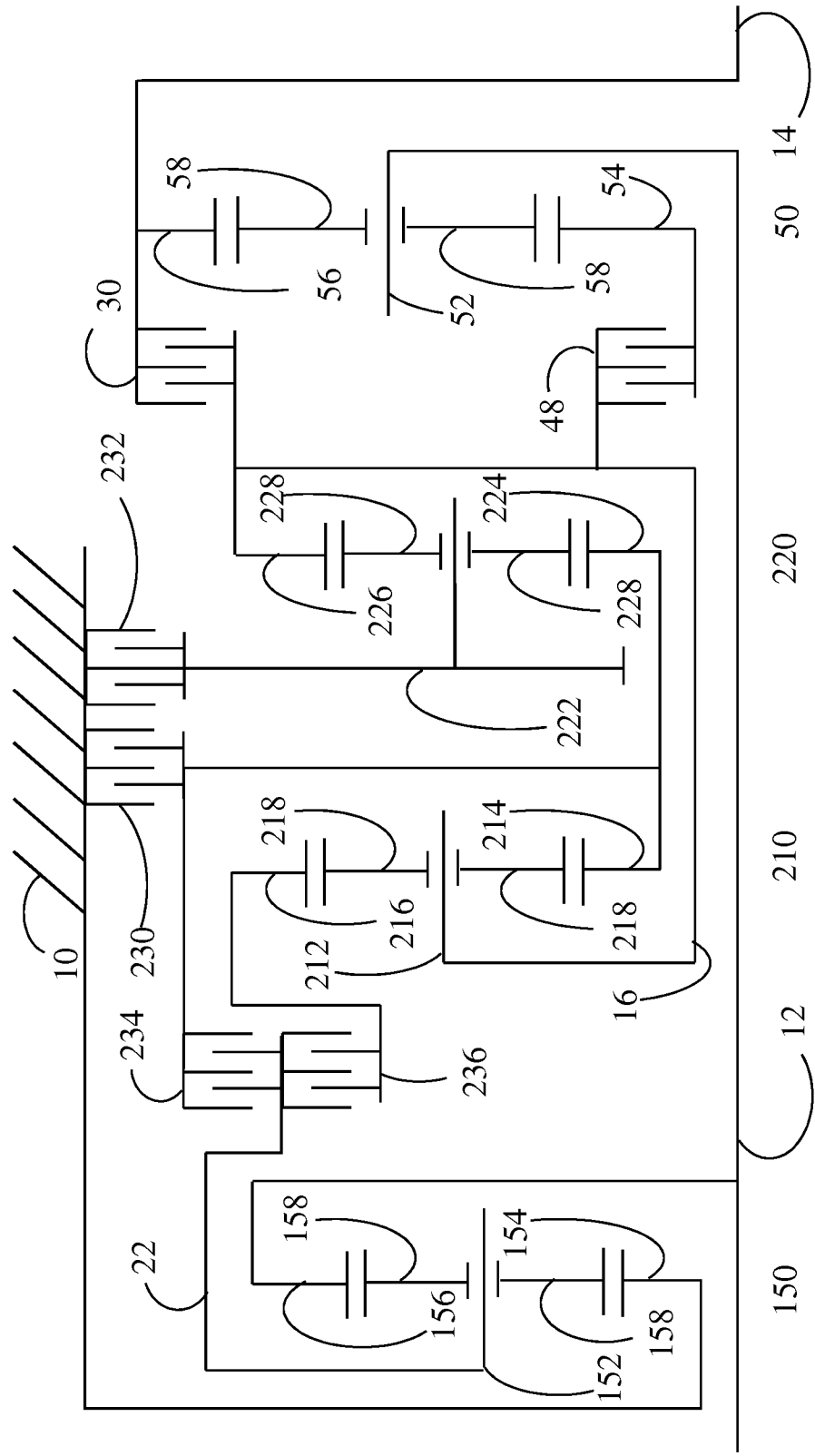
FIG. 8 is schematic view of an eighth transmission gearing arrangement.

Another example transmission is schematically illustrated in FIG. 8. The transmission of FIG. 8 utilizes four simple planetary gear sets 50, 150, 210, and 220. Illustrative ratios of gear teeth for each gear set of FIG. 8 are listed in Table 12.

TABLE 12

| Ring 56/Sun 54 | 1.500 |
| Ring 156/Sun 154 | 3.000 |
| Ring 216/Sun 215 | 2.400 |
| Ring 226/Sun 224 | 2.200 |

In the transmission of FIG. 8, sun gear 154 is fixedly held against rotation. Input 12 is fixedly coupled to ring gear 156 and to carrier 52. Carrier 212 is fixedly coupled to ring gear 226 by first shaft 16. Fourth shaft 22 is fixedly coupled to carrier 152. Output 14 is fixedly coupled to ring gear 56 and selectively directly coupled to shaft 16 by low clutch 30. Sun gear 54 is selectively coupled to first shaft 16 by high clutch 48. Sun gear 214 and sun gear 224 are selectively held against rotation by first brake 230 and selectively coupled to fourth shaft 22 by first clutch 234. Carrier 222 is selectively held against rotation by second brake 232. Finally, fourth shaft 22 is selectively coupled to ring gear 216 by second clutch 236.

As shown in Table 13, engaging the shift elements in combinations of three establishes nine forward speed ratios and one reverse speed ratio between input shaft 12 and output shaft 14. When the gear sets have tooth number ratios as indicated in Table 12, the speed ratios have the values indicated in Table 13.

TABLE 13

| | 30 | 48 | 230 | 232 | 234 | 236 | Ratio | Step |
|---|---|---|---|---|---|---|---|---|
| Rev | X | | | X | X | | −2.93 | 94% |
| 1st | X | | | X | | X | 3.11 | |
| 2nd | X | | X | | | X | 1.89 | 1.65 |
| 3rd | X | | | | X | X | 1.33 | 1.42 |
| 4th | X | X | | | | X | 1.00 | 1.33 |
| 5th | | X | | | X | X | 0.86 | 1.17 |
| 6th | | X | X | | | X | 0.76 | 1.13 |
| 7th | | X | | X | | X | 0.69 | 1.11 |
| 8th | | X | X | X | | | 0.60 | 1.15 |
| 9th | | X | | X | X | | 0.53 | 1.14 |

Various combinations of gear sets and shift elements impose particular speed relationships. The combination of gear sets 210 and 220 and shift elements 230, 232, 234, and 236 selectively impose a plurality of proportional speed relationships between fourth shaft 22 and first shaft 16. Specifically, engaging the shift elements in various combinations of two imposes one reverse speed relationship, two underdrive speed relationships, and a direct drive speed relationship. Gear set 150 establishes a fixed underdrive speed relationship between input 12 and fourth shaft 22. In combination, these components impose a plurality of speed relationships between input 12 and first shaft 16. Combining planetary gear set 50 and high clutch 48 collectively selectively establish a linear speed relationship among first shaft 16, input 12, and output 14.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A transmission comprising:
   an input;
   an output;
   a first gearing arrangement configured to impose a plurality of selective proportional speed relationships between the input and a first shaft; and
   a second gearing arrangement configured to i) impose a linear speed relationship among the first shaft, a second shaft, and the output, ii) selectively couple the first shaft to the output, and iii) impose a proportional speed relationship between the input and the second shaft.

2. The transmission of claim 1 wherein the first gearing arrangement comprises:
   a third gearing arrangement configured to impose a plurality of selective proportional speed relationships between the input and a third shaft, including at least one selective proportional speed relationship wherein the third shaft rotates faster than the input; and
   a fourth gearing arrangement configured to fixedly impose a proportional speed relationship between the third shaft and the first shaft wherein the first shaft rotates slower than the third shaft.

3. The transmission of claim 2 wherein the third gearing arrangement comprises:
   a first simple planetary gear set having a first sun gear, a first carrier fixedly coupled to the third shaft, and a first ring gear;
   a second simple planetary gear set having a second sun gear, a second carrier fixedly coupled to the first ring gear, and a second ring gear fixedly coupled to the first carrier;
   a first clutch configured to selectively couple the input to the first sun gear;
   a second clutch configured to selectively couple the input to the second sun gear;
   a first brake configured to selectively hold the second sun gear against rotation;
   a second brake configured to selectively hold the first ring gear and the second carrier against rotation; and
   a third clutch configured to selectively couple the input to the first ring gear and the second carrier.

4. The transmission of claim 2 wherein the third gearing arrangement comprises:

a first simple planetary gear set having a first sun gear, a first carrier fixedly coupled to the third shaft, and a first ring gear;
a second simple planetary gear set having a second sun gear fixedly coupled to the input, a second carrier fixedly coupled to the first ring gear, and a second ring gear;
a third simple planetary gear set having a third sun gear, a third carrier fixedly coupled to the second ring gear, and a third ring gear fixedly coupled to the first carrier;
a first brake configured to selectively hold the first sun gear against rotation;
a first clutch configured to selectively couple the input to the third sun gear;
a second brake configured to selectively hold the third sun gear against rotation;
a third brake configured to selectively hold the second ring gear and the third carrier against rotation; and
a second clutch configured to selectively couple the input to the second ring gear and the third carrier.

5. The transmission of claim 2 wherein the third gearing arrangement comprises:
a second simple planetary gear set having a second sun gear fixedly held against rotation, a second carrier, and a second ring gear fixedly coupled to the input;
a Ravigneaux gear set having a third sun gear, a fourth sun gear, a third carrier, and a third ring gear fixedly coupled to the third shaft;
a first brake configured to selectively hold the third sun gear against rotation;
a second brake configured to selectively hold the third carrier against rotation;
a first clutch configured to selectively couple the second carrier to the third sun gear;
a second clutch configured to selectively couple the second carrier to the fourth sun gear; and
a third clutch configured to selectively couple the input to the third carrier.

6. The transmission of claim 2 wherein the fourth gearing arrangement comprises:
a third axis transfer gear fixedly coupled to the third shaft; and
a fourth axis transfer gear fixedly coupled to the first shaft and in continuous meshing engagement with the third axis transfer gear.

7. The transmission of claim 2 wherein the fourth gearing arrangement comprises:
a first simple planetary gear set having a first sun gear fixedly held against rotation, a first carrier fixedly coupled to the first shaft, and a first ring gear fixedly coupled to the third shaft.

8. The transmission of claim 1 wherein the first gearing arrangement comprises:
a fifth gearing arrangement configured to impose a plurality of selective proportional speed relationships between a fourth shaft and the first shaft; and
a sixth gearing arrangement configured to fixedly impose a proportional speed relationship between the input and the fourth shaft wherein the fourth shaft rotates slower than the input.

9. The transmission of claim 8 wherein the fifth gearing arrangement comprises:
a second simple planetary gear set having a second sun gear fixedly held against rotation, a second carrier, and a second ring gear fixedly coupled to the fourth shaft;
a Ravigneaux gear set having a third sun gear, a fourth sun gear, a third carrier, and a third ring gear fixedly coupled to the first shaft;
a first brake configured to selectively hold the third sun gear against rotation;
a second brake configured to selectively hold the third carrier against rotation;
a first clutch configured to selectively couple the second carrier to the third sun gear;
a second clutch configured to selectively couple the second carrier to the fourth sun gear; and
a third clutch configured to selectively couple the fourth shaft to the third carrier.

10. The transmission of claim 8 wherein the fifth gearing arrangement comprises:
a second simple planetary gear set having a second sun gear, a second carrier, and a second ring gear;
a third simple planetary gear set having a third sun gear fixedly coupled to the second sun gear, a third carrier, and a third ring gear fixedly coupled to the second carrier;
a first brake configured to selectively hold the second sun gear and the third sun gear against rotation;
a second brake configured to selectively hold the third carrier against rotation;
a first clutch configured to selectively couple the fourth shaft to the second sun gear and the third sun gear; and
a second clutch configured to selectively couple the fourth shaft to the second ring gear.

11. The transmission of claim 8 wherein the sixth gearing arrangement comprises:
a first simple planetary gear set having a first sun gear fixedly held against rotation, a first carrier fixedly coupled to the fourth shaft, and a first ring gear fixedly coupled to the input.

12. The transmission of claim 1 wherein the second gearing arrangement is configured to fixedly impose a linear speed relationship among the first shaft, the second shaft, and the output and to selectively impose a proportional speed relationship between the input and the second shaft.

13. The transmission of claim 12 wherein the second gearing arrangement comprises:
a first axis transfer gear;
a second axis transfer gear fixedly coupled to the second shaft and in continuous meshing engagement with the first axis transfer gear;
a combining simple planetary gear set having a combining sun gear fixedly coupled to the first shaft, a combining carrier fixedly coupled to the second shaft, and a combining ring gear fixedly coupled to the output;
a low clutch configured to selectively couple the first shaft to the output; and
a high clutch configured to selectively couple the input to the first axis transfer gear.

14. The transmission of claim 13 wherein the low clutch is configured to directly selectively couple the first shaft to the output.

15. The transmission of claim 12 wherein the second gearing arrangement comprises:
a first simple planetary gear set having a first sun gear, a first carrier fixedly coupled to the input, and a first ring gear fixedly coupled to the second shaft;
a combining simple planetary gear set having a combining sun gear fixedly coupled to the first shaft, a combining carrier fixedly coupled to the second shaft, and a combining ring gear fixedly coupled to the output;
a low clutch configured to selectively couple the first shaft to the output; and
a high brake configured to selectively hold the first sun gear against rotation.

16. The transmission of claim 15 wherein the low clutch is configured to selectively couple the first shaft to the output by directly selectively coupling the combining carrier to another element of the combining simple planetary gear set.

17. The transmission of claim 1 wherein the second gearing arrangement is configured to selectively impose a linear speed relationship among the first shaft, the second shaft, and the output and to fixedly impose a proportional speed relationship between the input and the second shaft.

18. The transmission of claim 17 wherein the second shaft is fixedly coupled to the input.

19. The transmission of claim 17 wherein the second shaft is constrained to rotate faster than the input.

20. The transmission of claim 17 wherein the second gearing arrangement comprises:
    a combining simple planetary gear set having a combining sun gear fixedly coupled to the first shaft, a combining carrier, and a combining ring gear fixedly coupled to the output;
    a low clutch configured to selectively couple the first shaft to the output; and
    a high clutch configured to selectively couple the second shaft to the combining carrier.

21. The transmission of claim 20 wherein the low clutch is configured to directly selectively couple the first shaft to the output.

22. The transmission of claim 20 wherein the low clutch is configured to selectively couple the first shaft to the output by directly selectively coupling the combining carrier to another element of the combining simple planetary gear set.

23. The transmission of claim 17 wherein the second gearing arrangement comprises:
    a combining simple planetary gear set having a combining sun gear, a combining carrier fixedly coupled to the second shaft, and a combining ring gear fixedly coupled to the output;
    a low clutch configured to selectively couple the first shaft to the output; and
    a high clutch configured to selectively couple the first shaft to the combining sun gear.

24. The transmission of claim 17 wherein the second gearing arrangement comprises:
    a combining simple planetary gear set having a combining sun gear fixedly coupled to the first shaft, a combining carrier fixedly coupled to the second shaft, and a combining ring gear;
    a low clutch configured to selectively couple the first shaft to the output; and
    a high clutch configured to selectively couple the output to the combining ring gear.

* * * * *